United States Patent
Courville et al.

(10) Patent No.: US 10,942,671 B2
(45) Date of Patent: Mar. 9, 2021

(54) SYSTEMS, METHODS AND DEVICES FOR A MULTISTAGE SEQUENTIAL DATA PROCESS

(71) Applicant: Huawei Technologies Co., Ltd., Shenzhen (CN)

(72) Inventors: Vanessa Courville, Markham (CA); Manuel Saldana, Toronto (CA); Barnaby Dalton, Mississauga (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 1079 days.

(21) Appl. No.: 15/137,543

(22) Filed: Apr. 25, 2016

(65) Prior Publication Data

US 2017/0308324 A1 Oct. 26, 2017

(51) Int. Cl.
| | |
|---|---|
| *G06F 3/06* | (2006.01) |
| *G06N 3/04* | (2006.01) |
| *G06N 20/00* | (2019.01) |
| *G06N 3/02* | (2006.01) |
| *G06N 3/08* | (2006.01) |

(52) U.S. Cl.
CPC .......... *G06F 3/0656* (2013.01); *G06F 3/0608* (2013.01); *G06F 3/0673* (2013.01); *G06N 3/02* (2013.01); *G06N 3/0454* (2013.01); *G06N 3/084* (2013.01); *G06N 20/00* (2019.01)

(58) Field of Classification Search
CPC ............ G06N 20/00; G06N 3/02; G06N 3/08; G06N 3/084; G06N 3/04; H04L 67/1097; G05B 23/0283; G05B 2219/35001
See application file for complete search history.

(56) References Cited

U.S. PATENT DOCUMENTS

| | | | | |
|---|---|---|---|---|
| 5,812,993 A * | 9/1998 | Ginosar | ............... | G06N 3/063 706/26 |
| 2006/0274969 A1 | 12/2006 | Nagao et al. | | |
| 2008/0319933 A1 * | 12/2008 | Moussa | ............... | G06N 3/063 706/31 |
| 2010/0149425 A1 | 6/2010 | Chao et al. | | |

FOREIGN PATENT DOCUMENTS

| | | |
|---|---|---|
| CN | 1610376 A | 4/2005 |
| WO | 2008153194 A1 | 12/2008 |

OTHER PUBLICATIONS

Hecht-Nielsen, "Kolmogorov's Mapping Neural Network Existence Theorem," 1987, pp. III-11-III-13 (Year: 1987).*

* cited by examiner

*Primary Examiner* — Miranda M Huang
*Assistant Examiner* — Catherine F Lee
(74) *Attorney, Agent, or Firm* — Slater Matsil, LLP

(57) ABSTRACT

A circuit for a multistage sequential data process includes a plurality of memory units. Each memory unit is associated with a stage of the sequential data process which, for each data set inputted to the stage, the stage provides an intermediate data set for storage in the associated memory unit for use in at least one subsequent stage of the sequential data process, where each of the plurality of memory units is sized based on relative locations of the stage providing the intermediate data set and the at least one subsequent stage in the sequential data process.

20 Claims, 13 Drawing Sheets

1300

For each stage, store intermediate data set provided by the stage in an associated memory unit sized based on relative stage location
1310

Provide intermediate data set from the memory unit to a subsequent stage during a corresponding data processing cycle
1320

FIG. 13

SYSTEMS, METHODS AND DEVICES FOR A MULTISTAGE SEQUENTIAL DATA PROCESS

FIELD

Embodiments described herein relate generally to systems, devices and methods for sequential data processes, and in particular, some embodiments relate to systems, devices and methods for memory management for sequential data processes.

BACKGROUND

In sequential data processing, results from one data process can be stored for use in a later data process in the sequence. In some processes, intermediate data from multiple stages of a process must be stored. For data intensive processes, the management of such intermediate data can have large memory requirements.

This can be especially true for data processes such as the training of a neural network where intermediate values from a first data process in a sequence of data processes may have to be stored for use in the last data process in the sequence.

DESCRIPTION OF THE FIGURES

FIG. 13 is a flowchart view of an example method for a multistage data process.

Figure 1:
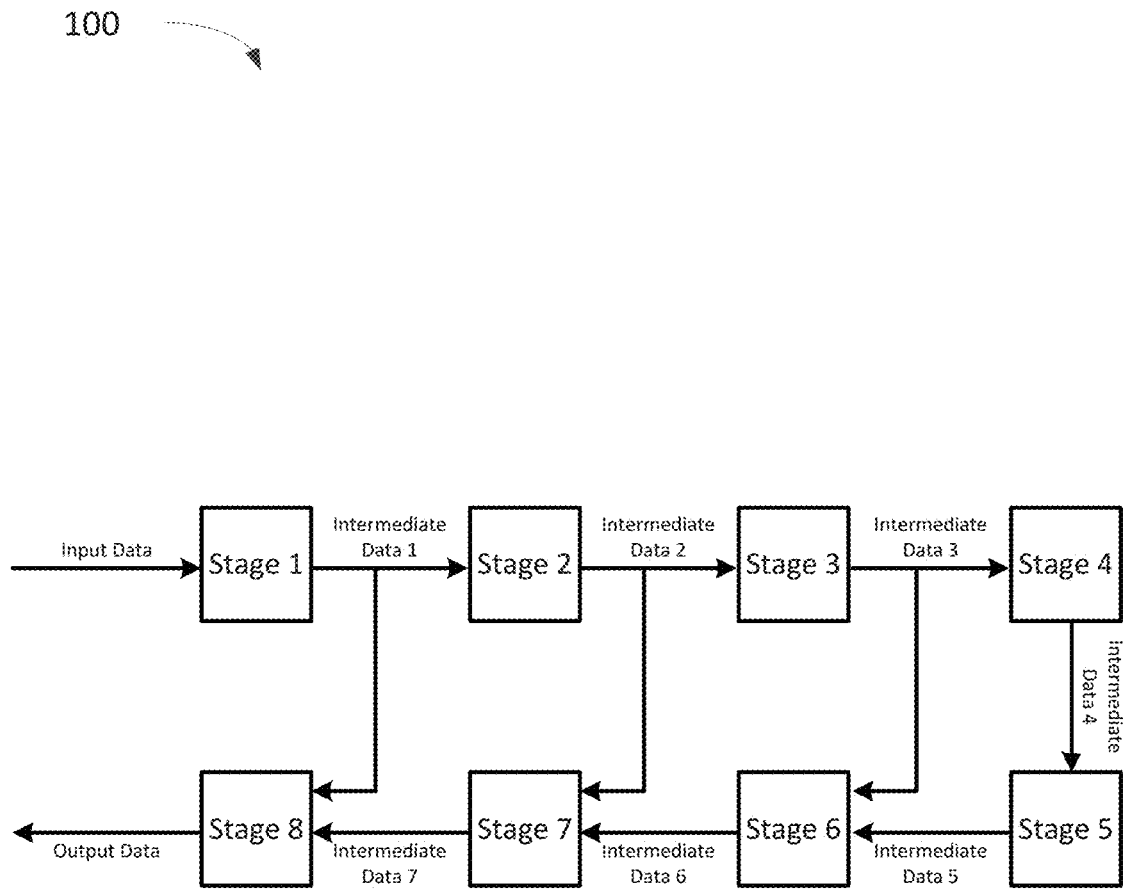
FIG. 1 is a schematic view showing aspects of an example data process and architecture where intermediate data from one stage is used in both the next stage and a later stage.

These drawings depict example embodiments for illustrative purposes, and variations, alternative configurations, alternative components and modifications may be made to these example embodiments.

SUMMARY

In an aspect, there is provided a circuit for a multistage sequential data process. The circuit includes: a plurality of memory units, each memory unit associated with a stage of the sequential data process which, for each data set inputted to the stage, the stage provides an intermediate data set for storage in the associated memory unit for use in at least one subsequent stage of the sequential data process. Each of the plurality of memory units is sized based on relative locations of the stage providing the intermediate data set and the at least one subsequent stage in the sequential data process.

In another aspect, there is provided a method for a multistage sequential data process. The method includes: for each of a plurality of stages of the sequential data process, storing an intermediate data set provided by the stage in an associated memory unit of a plurality of memory units, the associated memory unit sized based on relative locations of the stage providing intermediate data sets for storage and at least one subsequent stage in the sequential data process which is configured to process the corresponding stored intermediate data sets; and for each associated memory unit, providing an intermediate data set stored in the memory unit to the at least one subsequent stage during a respective corresponding data processing cycle.

In another aspect, there is provided a device for a multistage sequential data process. The device includes a plurality of memory units, each memory unit associated with a stage of the sequential data process which, for each data set inputted to the stage, the stage provides an intermediate data set for storage in the associated memory unit for use in at least one subsequent stage of the sequential data process, where each of the plurality of memory units is sized based on relative locations of the stage providing the intermediate data set and the at least one subsequent stage in the sequential data process.

DETAILED DESCRIPTION

Sequential data processes involve processing an input data set through a sequence of data processing stages with the output of one stage being fed into a subsequent stage. In computationally-intense applications, a batch processing technique may be used whereby a GPU (graphics processing unit) or similar device can be used to compute a batch of input data for a single stage, and then using the resulting batch of intermediate data, the next stage of the application can be computed.

However, in certain data processing applications, intermediate data from one stage may be used in both the next stage and other stage(s) later in the process. Using a batch processing approach, large amounts of memory may be required to store intermediate data for large batch sizes. This memory requirement may be exasperated if a data process has multiple stages which each require the storage of intermediate data for use later in the data process.

In some embodiments, aspects of the present disclosure may reduce memory requirements and/or may reduce memory limitations for different data processing approaches.

FIG. 1 shows an example sequential data process 100 where intermediate data from one stage is used in both the next stage and for a later stage in the process. For example, the Intermediate Data 1 from Stage 1 is used in Stage 2 and in Stage 8. Similarly, the Intermediate Data 2 from Stage 2 is used in Stage 3 and in Stage 7; and Intermediate Data 3 from Stage 3 is used in Stage 4 and in Stage 6.

To batch process input data through the eight stages, a GPU can perform the computational process of Stage 1 on a large input data set to generate Intermediate Data 1 which may be an intermediate data set as large as, or in some applications, larger than the input data set. This intermediate data set from Stage 1 must be stored until the batch processing reaches Stage 8. Similarly, a second large intermediate data set from Stage 2 must be stored until the batch processing reaches Stage 7; and a third large intermediate data set from Stage 3 must be stored until the batch processing reaches Stage 6. In this example, the sequential data process 100 may require memory to store three large intermediate data sets which may be proportional to the batch size. Depending on the bit-length of the data and the size of the batch, different computational processes may require significant amounts of memory.

In some instances, the sequential data process 100 of FIG. 1 is representative of at least a portion of a neural network training process. In the field of machine learning, artificial neural networks are computing structures which use sets of labelled (i.e. pre-classified) data to 'learn' their defining features. Once trained, the neural network architecture may then be able to classify new input data which has not been labeled. A deep neural network (DNN) can be modelled as two or more artificial neural network layers between input and output layers. Each layer can include a number of nodes with interconnections to nodes of other layers and their corresponding weights. The outputs of the deep neural network can be computed by a series of matrix functions as the input data values propagate through the various nodes and weighted interconnects. In some examples, deep neural networks include a cascade of artificial neural network layers for computing various machine learning algorithms on a data set.

The training process is an iterative process which can involve a feed-forward phase and a back-propagation phase. In the feed-forward phase, input data representing sets of pre-classified data is fed through the neural network layers and the resulting output is compared with the desired output. In the back-propagation phase, errors between the outputs are propagated back through the neural network layers, and adjustments are made to the weights.

Figure 2:
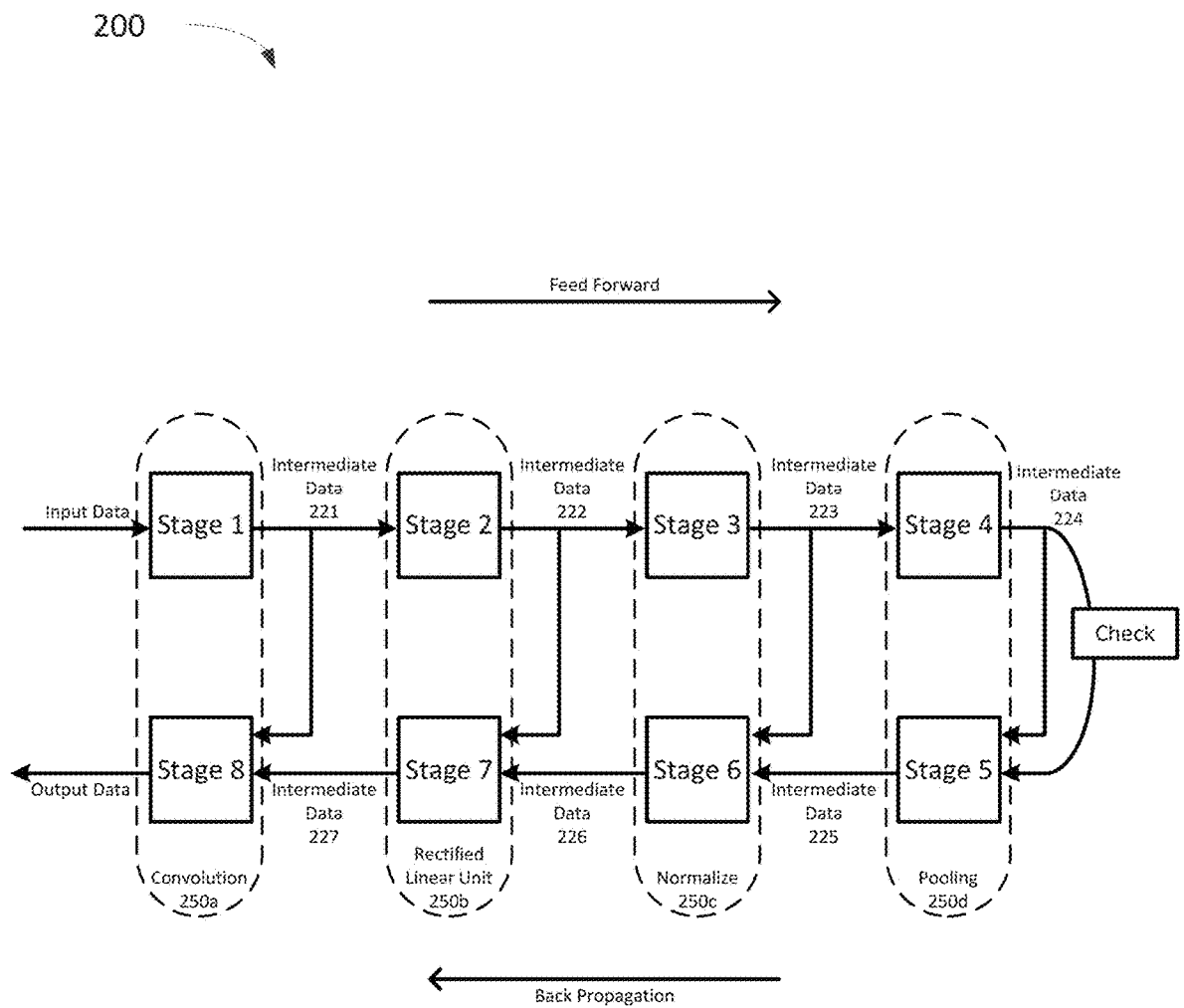
FIG. 2 is a schematic view showing aspects of an example data process and architecture for a sequential neural network training process.

FIG. 2 shows aspects of an example sequential neural network training process 200. During training, a large training input data set is split into smaller batches, sometimes referred to as mini-batches. In some instances, the size of a mini-batch can affect time and resource costs associated with training, as well as the performance of the trained neural network (i.e. how accurately the neural network classifies data).

In the feed-forward phase, each layer 250*a*, 250*b*, 250*c*, 250*d* of the neural network architecture performs a computation on a mini-batch producing a new intermediate data point set which are then fed into the next layer of the architecture. For example, the feed-forward stage (Stage 1) of the convolution layer 250*a* receives an input data set and generates a first intermediate data set 221 which is then fed into the feed-forward stage (Stage 2) of the rectified linear unit layer 250*b*. The first intermediate data set 221 is an input to the back propagation stage (Stage 8) of the convolution layer 250*a*. However, since the back-propagation stage of a layer does not occur immediately after its feed-forward stage (as there are multiple other computational layers in between), the intermediate data set must be stored or otherwise retained so that it is available for the corresponding back-propagation stage. Specifically, the intermediate data set 221 must be available until the corresponding data has propagated through Stages 2 through 7. This is similarly true for intermediate data set 222, intermediate data set 223 and intermediate data set 224 which must be available when the corresponding data has propagated through to Stages 7, 6, and 5 respectively.

Figure 3:
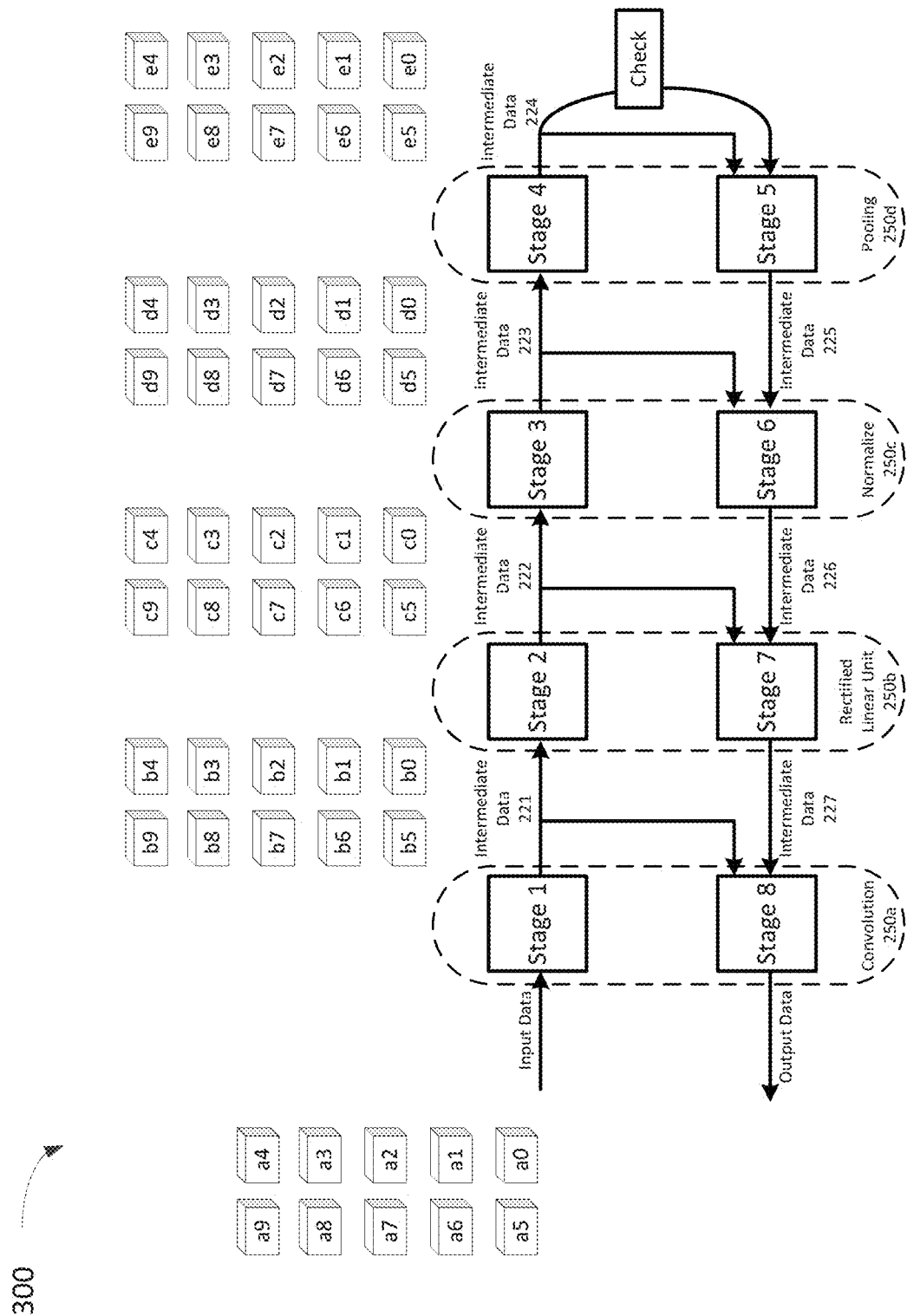
FIG. 3 is a schematic view of an example data process and architecture using a batch processing approach.

FIG. 3 illustrates a batch processing approach for the sequential neural network training process 300 where a batch of n-dimensional vector data points a0 . . . a9 is to be inputted into the neural network architecture. The entire batch is fed into Stage 1 to generate a corresponding batch of intermediate data points b0 . . . b9. This batch is then fed into Stage 2 to generate intermediate data points c0 . . . c9. This continues until the batch propagates through Stage 8. Since the back propagation stages rely on intermediate data from the feed forward stages, the process 300 must store intermediate data points provided by each feed forward stage for the entire batch namely intermediate data points b0 . . . b9, c0 . . . c9, d0 . . . d9 and e0 . . . e9. In this illustrative example, for an architecture with four layers and a batch size of ten n-dimensional input data points, this creates forty intermediate data points to be stored.

Figure 4:
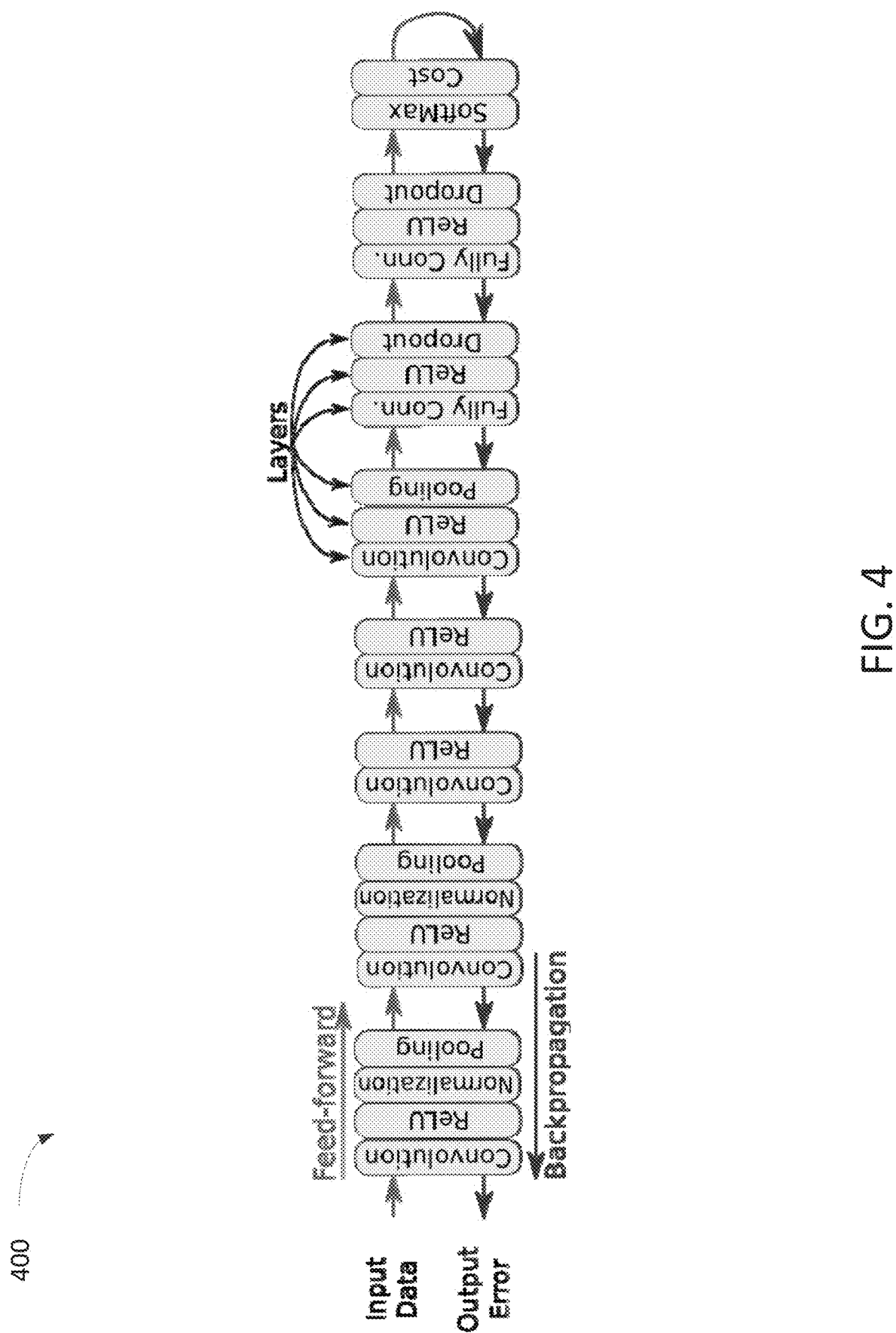
FIG. 4 is a schematic view of an example neural network architecture.

As the batch size, the number of dimensions for an input data point, and/or the number of layers increases, memory requirements for storing intermediate data can become a significant consideration. For example, FIG. 4 shows an example neural network architecture 400 having 23 layers. For large batch sizes, the memory requirements for such an architecture would be proportionally large. Depending on the system implementing the neural network architecture, available memory may become a limiting factor on the batch size. In some instances, this may affect the effectiveness and/or speed of a training process, and/or the performance of the trained neural network architecture.

Figure 5:
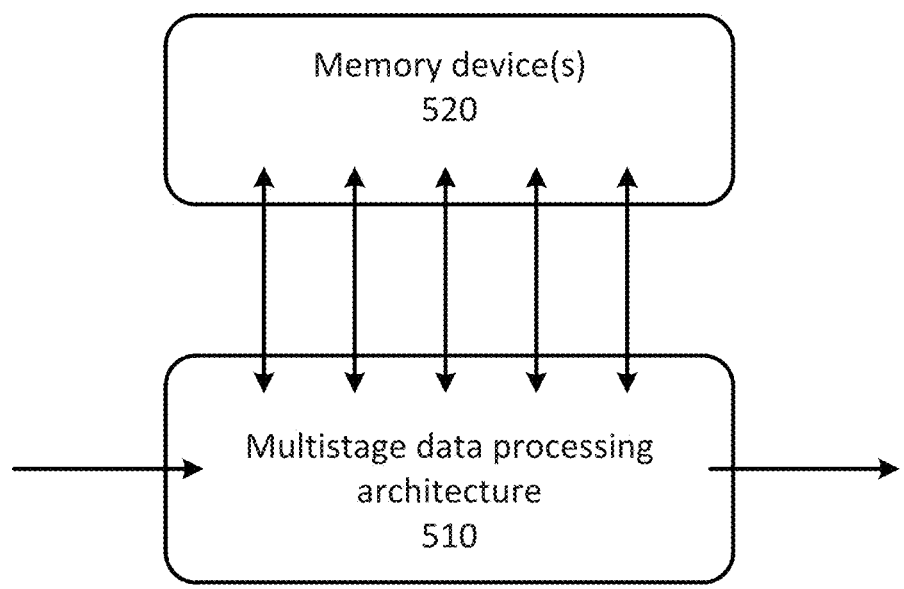
FIG. 5 is a schematic view of an example circuit for a multistage sequential data process.

FIG. 5 illustrates aspects of an example circuit 500 for a multistage sequential data process. The circuit 500 can be part of a larger circuit, device or system for a multistage sequential data process. The circuit 500 may be implemented with any combination of discrete and/or integrated components. In some embodiments, the circuit 500 can be implemented on a field-programmable gate array (FPGA) or an application-specific integrated circuit (ASIC), and/or as part of a larger device/system.

The circuit 500 includes one or more memory devices 520. In some embodiments, the memory devices 520 may be internal/embedded memory blocks, memory logic array blocks, integrated memory devices, on-chip memory, external memory devices, random access memories, block RAMs, registers, flash memories, electrically erasable programmable read-only memory, or any other suitable data storage device(s)/element(s) or combination thereof.

The memory device(s) 520 are physically or logically divided into a number of memory units. For example, in one embodiments, each memory unit can be stored on a different memory device. In another embodiment, a single memory device can be apportioned or allocated to two or more memory units. In some instances, a memory unit can be split across multiple memory devices. Any suitable physical and/or logical allocation or combination can be used.

Each memory unit is associated with a stage in the multistage data processing architecture 510 and stores intermediate data sets provided by the corresponding stage. In some embodiments, the intermediate data set provided by a stage is an input or output of the stage. The intermediate data sets stored in a memory unit are for use in one or more subsequent stages of the multistage data processing architecture 510. In some embodiments, one or more memory units provide the intermediate data sets to at least one non-adjacent, subsequent stage in the multistage data processing architecture 510.

The multistage data processing architecture 510 includes multiple data processing stages of the multistage data process. Each data processing stage is configured to perform a portion of the data process. In some embodiments, the processing of each data processing stage may be performed by a logic/computational circuit, a number of configurable logic blocks, a processor, or any other computational and/or logic element(s) configured to perform the particular data processing for the corresponding stage.

One or more of the memory units are sized based on the relative locations of the associated stages in the data process. In some embodiments, the memory units are sized based on the relative location of the stage providing the intermediate data sets for storage, and one or more subsequent stages which process the intermediate data sets.

In some embodiments, one or more of the memory units are sized to store a specific number of intermediate data sets that corresponds to the number of stages or cycles from the particular memory unit's associated stage to the subsequent stage which uses the intermediate data sets stored in the particular memory unit.

In some embodiments, the memory devices receive and/or provide intermediate data sets via one or more busses, interconnects, memory managers and/or any other connection and/or control circuit, or combination thereof.

Figure 6:
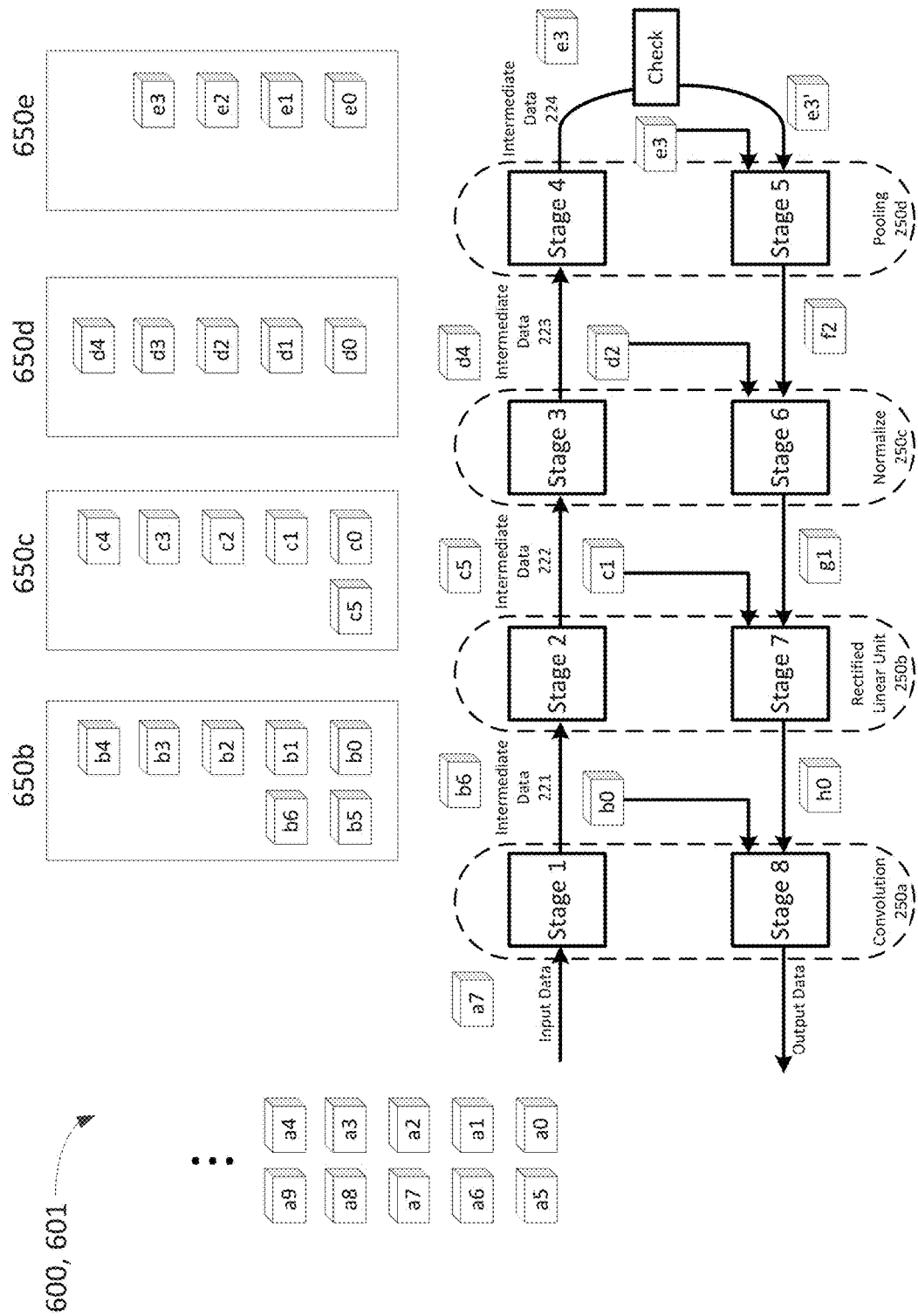
FIG. 6 is schematic view of an example data process and architecture using a stream processing approach.

FIG. 6 illustrates a stream processing approach for the sequential neural network training process 600 which has the same data processing architecture as the process 300 in FIG. 3. In this example, a stream of input data sets a0 . . . a9 . . . etc. are to be inputted for processing as a sequence. Input data set a0 is processed by Stage 1 to generate intermediate data set b0 which is provided for storage in memory unit 650b.

In the next cycle, intermediate data set b0 is inputted into Stage 2 to generate intermediate data set c0 which is provided for storage in memory unit 650c. Concurrently, input data set a1 is processed by Stage 1 to generate intermediate data set b1 which is provided for storage in memory unit 650b. Similar to a pipeline, each data set can propagate through a stage on each cycle.

In FIG. 6, the data process 600 is shown in a cycle where the first input data set a0 has propagated through Stages 1 through 7, and is being processed (as h0) by Stage 8 for the back propagation phase of Convolution layer 250a. The corresponding intermediate data point b0 is received from the memory unit 650b where it was stored after a0 was processed by Stage 1.

During the same cycle, the second input data set a1 has propagated through and is being processed (as g1) by Stage 7 for the back propagation phase of Rectified Linear Unit layer 250b. The corresponding intermediate data point c1 is provided by memory unit 650c where it was stored as the intermediate data set generated when b1 was processed by Stage 2.

The third input data set a2 has propagated through and is being processed (as f2) by Stage 6 for the back propagation phase of Normalize layer 250c. The corresponding intermediate data point d2 is provided by memory unit 650d where it was stored as the intermediate data set generated when c2 was processed by Stage 3.

As illustrated in FIG. 6, as more input data sets are streamed through the data process 600 and data processing architecture 601, the amount of data stored in the memory units 650b, 650c, 650d, 650e increases.

Figure 7:
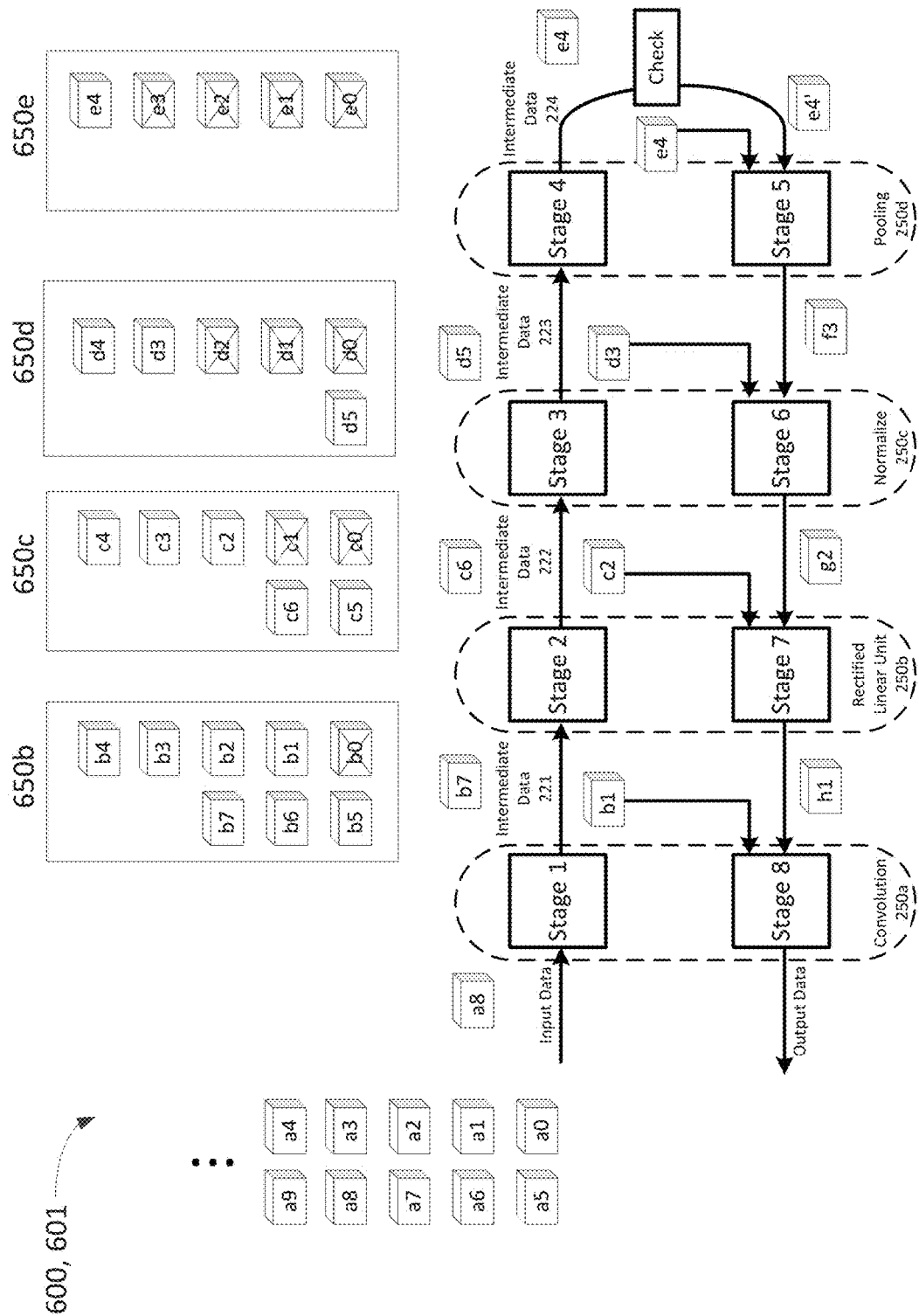
FIG. 7 is schematic view of the example data process and architecture in FIG. 6 in a subsequent cycle.

FIG. 7 shows the data process 600 of FIG. 6 in the cycle subsequent to the one illustrated in FIG. 6. As the data sets propagate through the sequential data process 600, intermediate data sets for earlier inputs may no longer be required for any subsequent processing in the back propagation stage. As illustrated in FIG. 7, intermediate data set b0 stored in memory unit 650b is no longer required as corresponding data set h0 has already been processed by Stage 8. This is similarly true of intermediate data sets c0 and c1 in memory unit 650c, intermediate data sets d0, d1 and 2 in memory unit 650d, and intermediate data sets c0, c1, c2 and c3 in memory unit 650e. These data sets can, in some embodiments, be discarded or overwritten.

In some embodiments, a data set (input or intermediate) can include a single n-dimensional input data point, or a mini-batch or any other set of n-dimensional input data points.

Figure 8:
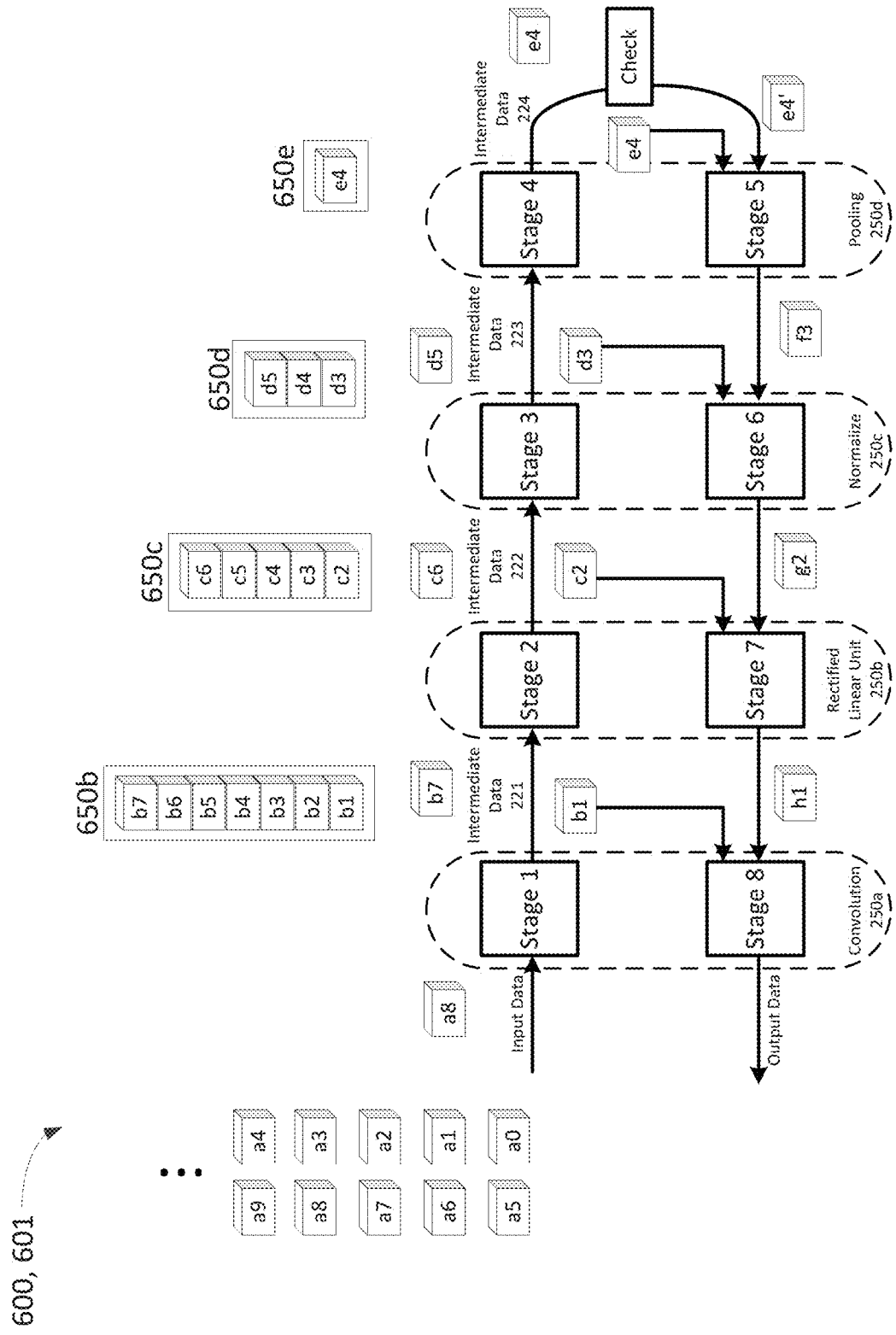
FIG. 8 is schematic view of an example data process and architecture using a stream processing approach.

Accordingly, as illustrated in FIG. 8, in some example embodiments, one or more memory units are sized to store a specific number of intermediate data sets. The specific number of intermediate data sets is based on the number of stages from the initial stage that provides the intermediate data sets for storage to a subsequent stage that uses the intermediate data sets stored in the memory unit. For example, memory unit 650b is sized to store seven intermediate data sets generated by Stage 1 as there are seven stages from Stage 1 (which provides the intermediate data sets for storage) to Stage 8 (which utilizes the intermediate data sets in storage).

Memory unit 650c is sized to store five intermediate data sets which corresponds to the number of stages from Stage 2 (which provides the intermediate data sets for storage) to Stage 7 (which utilizes the intermediate data sets in storage). Similarly, memory unit 650d is sized to store three intermediate data sets (Stage 3 to Stage 6) and memory unit 650e is sized to store one intermediate data set (Stage 4 to Stage 5).

In some embodiments memory units can be configured as a shift memory or series of shift registers. In some such embodiments, a newly introduced intermediate data set can be stored in a first memory location (of the memory unit 650b storing b7 in FIG. 8) and all other intermediate data sets in the memory unit are shifted to the next memory location (down). With the introduction of a new intermediate data set, the oldest intermediate data set in the memory unit 650b (is overwritten or is otherwise flushed from the memory unit. In other embodiments, the sequence of the shifting can be upwards, from left to right, or in any other first-in-first-out type order.

In another embodiment, the memory unit can be configured to store the N most recently introduced intermediate data sets by overwriting the oldest intermediate data set in the memory unit with a currently introduced intermediate data set. For example, a selector such as a pointer, counter, linked list, or other element or process can provide an address or other storage location identifier which changes with the introduction of each intermediate data set and cycles through each memory location. For example, the example circuit may include a counter as a selector for the memory unit.

As described herein, in some embodiments, circuits, devices and processes may implement a neural network architecture. In some examples, stages may represent compute layers in a neural network training process/architecture. In some embodiments, the memory units are configured to store intermediate data sets generated in feed-forward stages of the training process/architecture, and to provide stored intermediate data sets for use in the corresponding back-propagation stages.

In some embodiments, such as for symmetrical feed-forward/back-propagation data processes, each feed-forward stage has an associated memory unit sized to store 2n+1 intermediate data sets where n is the number of feed-forward stages from the particular feed-forward stage and the last feed-forward stage. For example, in FIG. 8, the memory unit 650b associated with Stage 1 is n=3 feed-forward stages from the last feed-forward stage (Stage 4), and is sized to store seven (2*3+1=7) intermediate data sets.

In general embodiments, memory units in the multistage data process or associated physical architecture are sized proportional to the location of the associated stages in the multistage data process. In some embodiments, the memory units are sized proportional to the location of the associated stage that provides the intermediate data sets for storage and the location of the associated stage(s) that rely on the intermediate data sets.

Figure 9:
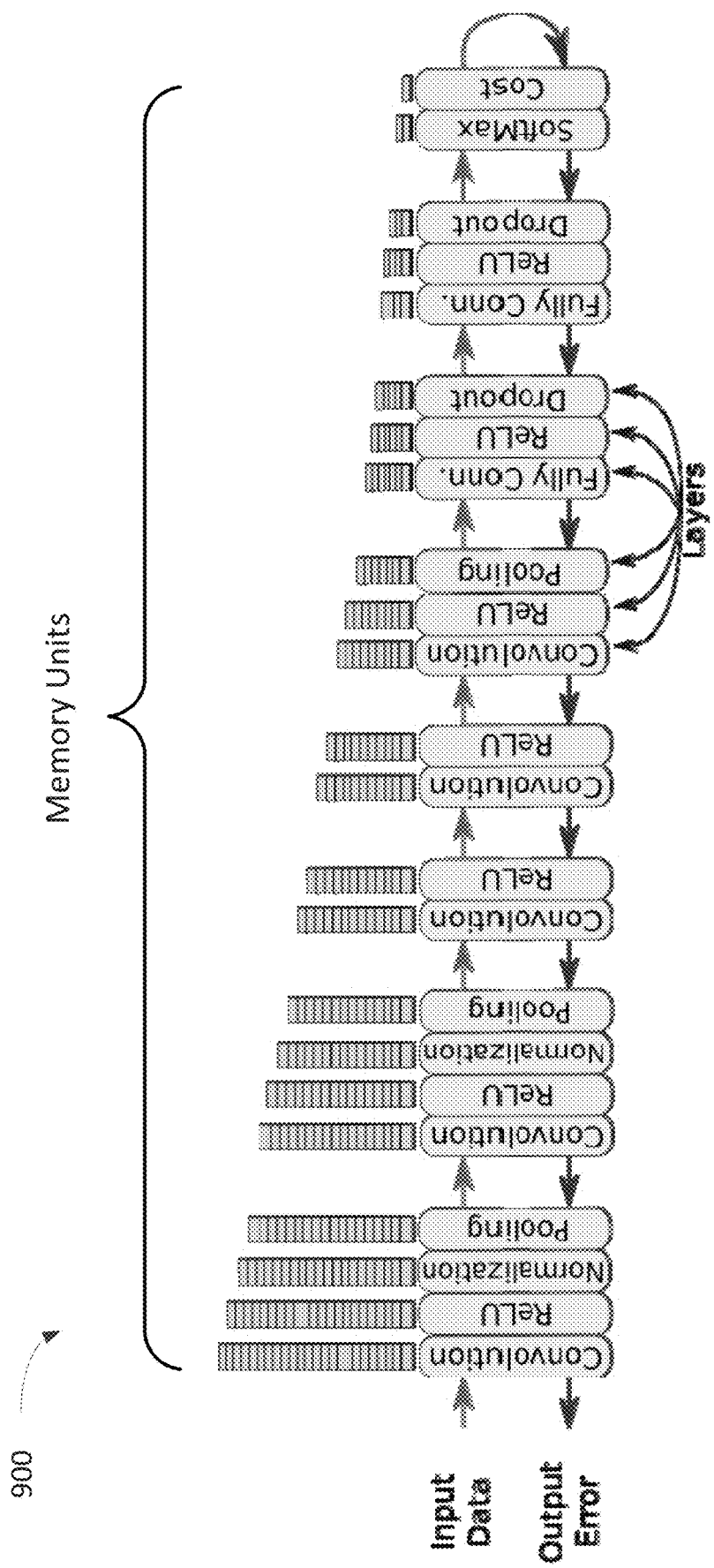
FIG. 9 is schematic view of an example neural network training process and architecture using a stream processing approach.

In some embodiments, in contrast to a batch processing approach where each stage requires storage for an entire batch of input data, the different-sized memory units based on their location in the process are independent of the batch size. For some data processes, this may result in a significant reduction in overall memory requirements. For example, FIG. 9 illustrates a neural network architecture 900 similar to FIG. 4 along with the memory units for each corresponding layer and their relative sizes. As illustrated by this example neural network architecture, in some instances, the larger the neural network, the larger the reduction in overall memory requirements related to a batch processing approach.

The example of a deep neural network architecture 900, which may be used for image classification, can be configured to receive input data as a stream or sequence of data sets introduced sequentially, for example, on a cycle-by-cycle basis. In some examples, a reduction in memory requirements may enable the use of different hardware implementations such as FPGAs or ASICs which may have been limited or unworkable due to previous memory requirements.

For example, it has been observed that a batch process for training a neural network architecture 400 similar to FIG. 4 using a GPU required more than 6 GB of memory. In a streaming approach where memory units were not sized relative to their location, the process required approximately 1.7 GB of memory. In a streaming approach where memory units were sized relative to their location in the process (illustrated, for example, in FIG. 9), the process required approximately 230 MB of memory.

In some embodiments, circuits, methods and devices described herein stream or sequentially process data sets through the architecture in a pipelined or pipeline-like manner. In some embodiments, a streaming approach can remove the dependency on memory resource requirements and the mini-batch size in a training process. For example, each data set (represented by a cube in FIGS. 6-8) can, in some instances, represent a mini-batch data set. In some instances, batch or mini-batch sizes may affect the effectiveness and/or speed of a training process, and/or the performance of the trained neural network architecture. Therefore, in some situations, by reducing or eliminating the relationship between a batch/mini-batch size and the memory requirements, the speed and/or effectiveness of a training process, and/or the performance of the trained neural network architecture may be improved.

In some instances, the pipeline approach may enable more effective streamlining of the architecture. For example, in a pipeline, when the speed of the slowest stage is improved, this improvement may have a much larger effect on improvement of the overall architecture than for a sequential non-pipelined version.

With reference, for example, to FIG. 9, in some embodiments, memory units associated with different stages may store intermediate data sets of different sizes. For example, a memory unit associated with a first stage may store intermediate data sets which are larger than intermediate data sets in a different stage. Depending on the data process performed by a stage, one stage may generate intermediate data sets having fewer data points and/or having shorter word lengths or lower data resolution.

In some embodiments, memory units are sized based on the amount of memory required to store a single intermediate data set which can be different between different memory units. For example, an intermediate data set generated by a first stage may be 256 kB, while an intermediate data set generated by a $20^{th}$ stage may be 16 kB. In some instances, each memory unit can be specifically sized by allocating, instantiating, or otherwise providing a memory unit which stores A intermediate data sets, each having a size of B bytes, where A is based on the relative location of the corresponding stage providing the intermediate data sets for storage in the data process, and B is the size of the intermediate data set provided by the corresponding stage. In some instances, by specifically sizing each memory unit based on these two factors, memory requirements may be further reduced.

FIG. 9 illustrates different example layers of a neural network training process. Layers can include, but are not limited to: convolution, rectified linear unit (ReLU), normalization, pooling, dropout, softmax, cost, or any other data manipulation or computation.

Figure 10:
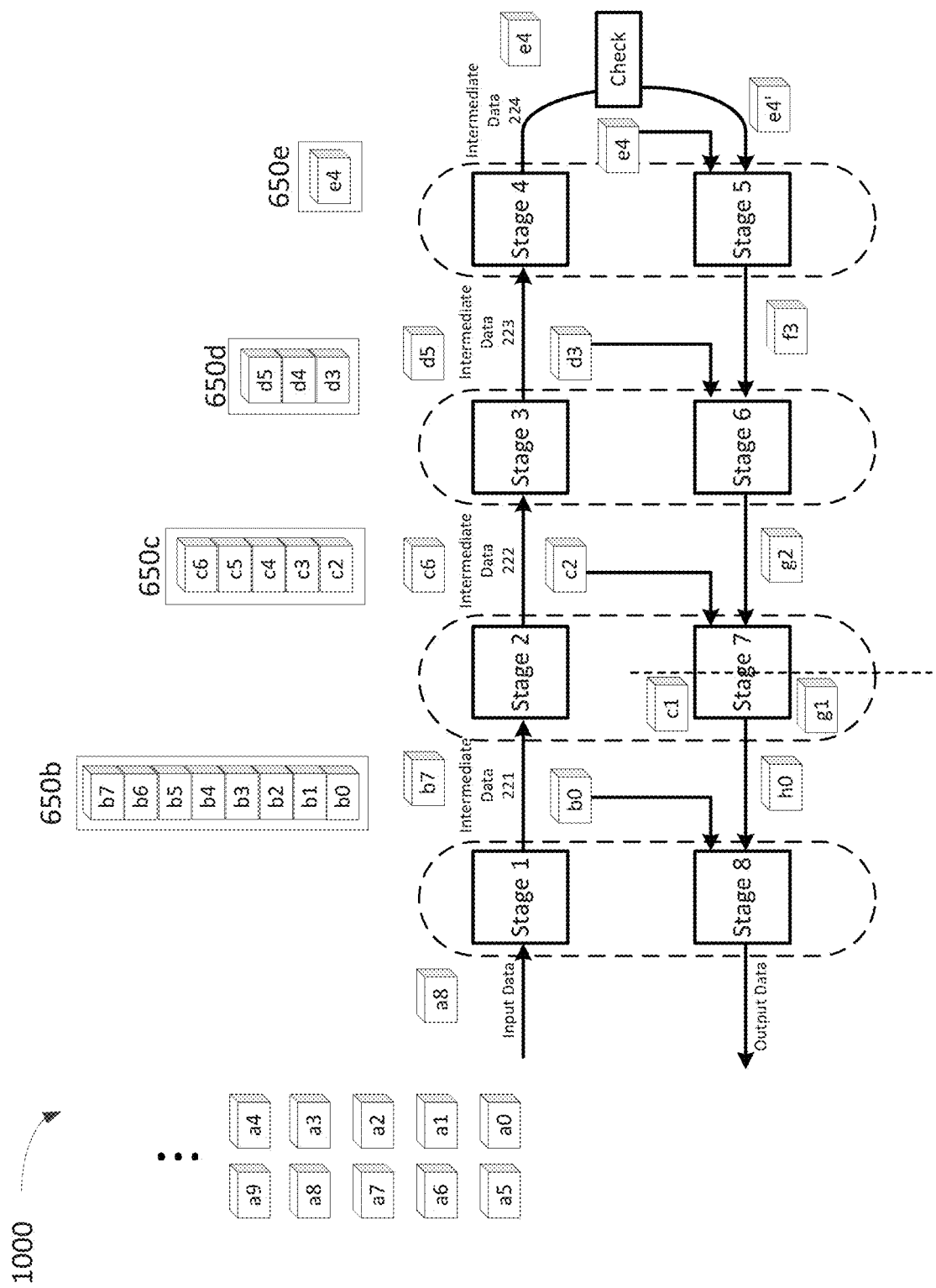
FIG. 10 is schematic view of an example data process and architecture having a stage requiring two cycles to complete.

In some applications, different stages of a linear multistage data process may take a different number of cycles to complete. FIG. 10 shows an example data process 1000 similar to the data process 600 of FIG. 8, except that Stage 7 requires two cycles to complete. Since input data set a0 which has been processed by Stage 1 to generate b0 requires an additional cycle to propagate through to Stage 8, memory unit 650b is sized to store eight intermediate data sets which corresponds to the number of cycles from the stage/cycle in which the intermediate data set is provided to the memory unit for storage to the stage/cycle for which the intermediate data set is retrieved from the memory unit.

In some embodiments, the sequential data process may include branches and/or multiple stages may rely on the same intermediate data set. In some such examples, a memory unit is sized to store a number of intermediate data sets corresponding to the largest number of cycles/stages from the stage/cycle in which the intermediate data set is provided to the memory unit for storage to any of the stages/cycles for which the intermediate data set is retrieved from the memory unit.

Figure 11:
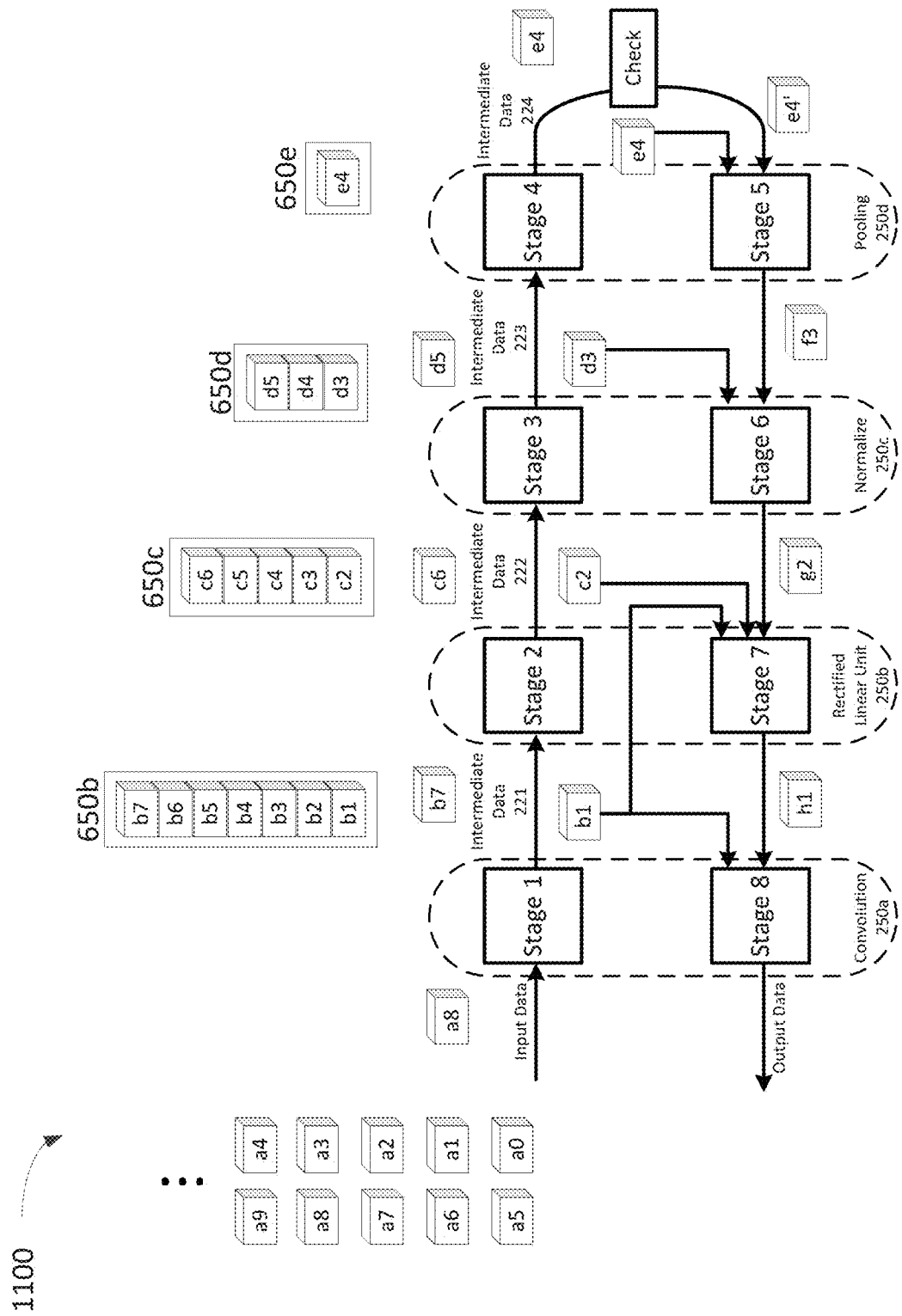
FIG. 11 is schematic view of an example data process and architecture where intermediate data from one stage is used in both the next stage and two later stages.

For example, FIG. 11 shows an example sequential data process 1100 where intermediate data point b1 which is provided to the memory unit 650b for storage in Stage 1 is retrieved from the memory unit in both Stages 7 and 8. Memory unit 650b is sized to store seven intermediate data sets which corresponds to the largest number of cycles/stages between Stage 1 and Stages 7 or 8.

Figure 12:
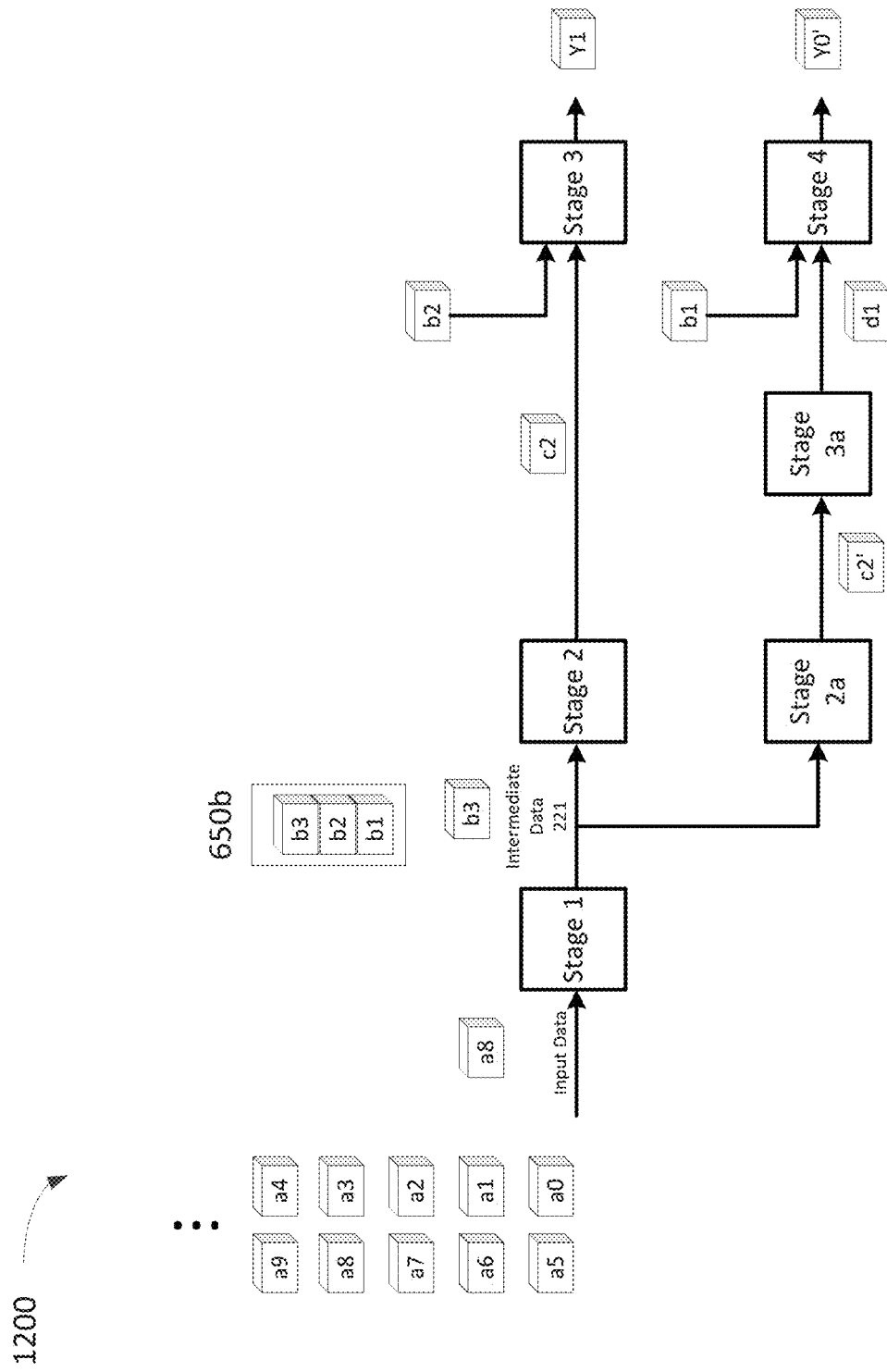
FIG. 12 schematic view of an example data process and architecture having multiple branches.

FIG. 12 shows an example sequential data process 1200 having a branch where intermediate data point b1 which is provided to the memory unit 650b for storage in Stage 1 is retrieved from the memory unit in both Stages 3 and 4. In the upper branch, there are two stages/cycles between Stage 1 (in which the intermediate data set is provided to the memory unit 650b for storage) and Stage 3 (in which the intermediate data set is retrieved from the memory unit 650b for processing). In the lower branch, there are three stages/ cycles between Stage 1 and Stage 4. Memory unit 650b is sized to store three intermediate data sets which corresponds to the largest number of cycles/stages between Stage 1 and Stages 3 or 4.

In some embodiments, where suitable, the memory unit sizing can be applied to loops, recursive algorithms, or any other cyclical data processes based on the largest number of stages/cycles between the stage/cycle in which an intermediate data point is provided for storage and a subsequent stage/cycle in which the intermediate data point is required for processing.

FIG. 13 illustrates a flowchart showing aspects of an example method 1300 for a multistage sequential data process. At 1310, for each stage which generates intermediate data for a subsequent, non-consecutive stage, store an intermediate data set provided by the stage in an associated memory unit. The memory unit is sized based on the relative location of the associated stage providing the intermediate data set for storage and at least one subsequent stage in the sequential data process.

At 1320, in a subsequent cycle, the intermediate data set stored in a memory unit is provided to a subsequent stage of the data process. This provisioning can occur concurrently for all intermediate data sets being provided to different stages of the data process in the current data processing cycle.

In some embodiments, an intermediate data set stored in a memory unit is provided during a data processing cycle which is N data processing cycles after the cycle in which the intermediate data set was provided to the memory unit for storage, where N is the number of stages or cycles from the stage providing the intermediate data set for storage and the stage to which the stored intermediate data set is provided for processing.

As described herein or otherwise, in some embodiments, the method includes computing or otherwise performing data processing for each stage to generate the intermediate data sets which may be used in the next stage and/or provided for storage in an associated memory unit for later processing.

As described herein or otherwise, in some embodiments, the method includes receiving input data as a stream or sequent of data sets for propagation through the stages of the sequential data process.

Aspects of some embodiments may provide a technical solution embodied in the form of a software product. Systems and methods of the described embodiments may be capable of being distributed in a computer program product including a physical, non-transitory computer readable medium that bears computer usable instructions for one or more processors. The medium may be provided in various forms, including one or more diskettes, compact disks, tapes, chips, magnetic and electronic storage media, volatile memory, non-volatile memory and the like. Non-transitory computer-readable media may include all computer-readable media, with the exception being a transitory, propagating signal. The term non-transitory is not intended to exclude computer readable media such as primary memory, volatile memory, RAM and so on, where the data stored thereon may only be temporarily stored. The computer useable instructions may also be in various forms, including compiled and non-compiled code.

Various example embodiments are described herein. Although each embodiment represents a single combination of inventive elements, all possible combinations of the disclosed elements are considered to the inventive subject matter. Thus if one embodiment comprises elements A, B, and C, and a second embodiment comprises elements B and D, then the inventive subject matter is also considered to include other remaining combinations of A, B, C, or D, even if not explicitly disclosed.

Although the present invention and its advantages have been described in detail, it should be understood that various changes, substitutions and alterations can be made herein without departing from the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A circuit for a multistage sequential data process, the circuit comprising:
   a plurality of memory units, each memory unit of the plurality of memory units associated with two related stages of the multistage sequential data process which, for a data set inputted to a first stage of the two related stages, the first stage provides an intermediate data set for storage in an associated memory unit for use in a second stage of the two related stages of the multistage sequential data process,
   wherein the first stage of the two related stages is a feed-forward stage and the second stage of the two related stages is a corresponding backpropagation stage of a layer of a neural network, wherein each memory unit is configured to store the intermediate data set generated in the feed-forward stage for use in the corresponding backpropagation stage,
   wherein each memory unit of the plurality of memory units has a size of a number of bytes pre-determined according to $(2n+1)*B$, where n is a number of feed-forward stages between the two related stages, and B is a number of bytes of the intermediate data set generated by the feed-forward stage of the two related stages.

2. The circuit of claim 1, the number of bytes is further pre-determined according to a number of processing cycles from the feed-forward stage to the corresponding backpropagation stage.

3. The circuit of claim 1 wherein one or more stages of the multistage sequential data process are compute layers in a neural network training process.

4. The circuit of claim 1 comprising: one or more computational elements for computing intermediate data sets for one or more stages of the multistage sequential data process for storage in the associated memory unit.

5. The circuit of claim 1, wherein the circuit is configured to receive input data as a sequence of data sets, each data set to propagate through each stage of the multistage sequential data process.

6. The circuit of claim 1, wherein each memory unit is configured to store $2n+1$ of the most recently generated intermediate data sets output by each of one or more compute stages of the multistage sequential data process.

7. The circuit of claim 1 wherein the circuit is implemented on a field-programmable gate array (FPGA) or an application specific integrated circuit (ASIC).

8. A method for a multistage sequential data process, the method comprising:
for each two related stages of the multistage sequential data process, storing an intermediate data set provided by a first stage of the two related stages in a memory unit associated with the two related stages, wherein the first stage of the two related stages is a feed-forward stage and a second stage of the two related stages is a corresponding backpropagation stage of a layer of a neural network, wherein each memory unit is configured to store the intermediate data set generated in the feed-forward stage for use in the corresponding backpropagation stage, wherein the associated memory unit has a size of a number of bytes pre-determined according to $(2n+1)*B$, where n is a number of feed-forward stages between the two related stages associated with the memory unit during a respective corresponding data processing cycle, and B is a number of bytes of the intermediate data set generated by the feed-forward stage of the two related stages; and
for each associated memory unit, providing the intermediate data set stored in the memory unit to the second stage of the two related stages.

9. The method of claim 8, wherein each associated memory unit is sized to store a number (N) of intermediate data sets, wherein N is a number of stages from a stage providing the intermediate data set for storage to a subsequent stage in the multistage sequential data process which is configured to process the intermediate data set.

10. The method of claim 9, Wherein the respective corresponding data processing cycle for a last subsequent stage is N data processing cycles after an earlier cycle in which the intermediate data set was provided by an associated stage for storing in the associated memory unit.

11. The method of claim 8, wherein one or more stages of the multistage sequential data process are compute layers in a neural network training process.

12. The method of claim 11 wherein the number of bytes is further pre-determined according to a number of data processing cycles from the feed-forward stage to the corresponding backpropagation stage.

13. The method of claim 8 comprising: computing the intermediate data set for one or more stages of the multistage sequential data process for storage in the associated memory unit.

14. The method of claim 8, comprising: receiving input data as a sequence of data sets, each data set to propagate through each stage of the multistage sequential data process.

15. The method of claim 8, wherein each associated memory unit is configured to store 2n+1 of the most recently provided intermediate data sets provided by a stage associated with that memory unit.

16. A device for training a neural network in a sequential manner, the device comprising:

a plurality of sequential computational elements, each computational element performing a computation of one of a feed-forward stage or a backpropagation stage of a layer of the neural network, each computational element configured to receive a data set, generate an intermediate data set based on the data set, and output the intermediate data, wherein the data set received by each computational element is either an input data set of the neural network or the intermediate data set generated by a previous computational element of the plurality of sequential computational elements; and
a plurality of memory units, each memory unit of the plurality of memory units associated with two related computational elements of the plurality of sequential computational elements, wherein the two related computational elements include a first computational element performing the computation of the feed-forward stage and a second computational element performing a computation of the backpropagation stage of the same layer of the neural network, each memory unit configured to store the intermediate data set generated by the computational element of the two related computational elements that performs the computation of the feed-forward stage,
wherein each memory unit of the plurality of memory units has a size of a number of bytes pre-determined according to $(2n+1)*B$, where n is a number of first computational elements between the two related computational elements, and B is a number of bytes of the intermediate data set generated by a first computational unit of the two related computational units.

17. The device of claim 16, wherein the device is a field-programmable gate array (FPGA) or an application-specific integrated circuit (MIC).

18. The circuit of claim 1, the pre-determined number of bytes is equal to $(2n+1)*B$.

19. The circuit of claim 1, the plurality of memory units comprising a first memory unit associated with first two related stages and a second memory unit associated with second two related stages, the first memory unit having a size of a first number of bytes pre-determined according to $(2n+1)*B1$, the second memory unit having a size of a second number of bytes pre-determined according to $(2n+1)*B2$, B1 being different from B2, and the first pre-determined number of bytes being different from the second pre-determined number of bytes.

20. The circuit of claim 1, the plurality of memory units comprising a first memory unit associated with first two related stages of a first layer of the neural network and a second memory unit associated with second two related stages of a second layer of the neural network, the first memory unit having a different size than the second memory unit, the first layer and the second layer being different layers of the neural network.

* * * * *

UNITED STATES PATENT AND TRADEMARK OFFICE
CERTIFICATE OF CORRECTION

PATENT NO. : 10,942,671 B2
APPLICATION NO. : 15/137543
DATED : March 9, 2021
INVENTOR(S) : Vanessa Courville et al.

Page 1 of 1

It is certified that error appears in the above-identified patent and that said Letters Patent is hereby corrected as shown below:

In the Claims

In Column 11, Line 33, Claim 10, delete "Wherein" and insert --wherein--.

In Column 12, Line 35, Claim 17, delete "(MIC)" and insert --(ASIC)--.

Signed and Sealed this
Twenty-second Day of June, 2021

Drew Hirshfeld
*Performing the Functions and Duties of the
Under Secretary of Commerce for Intellectual Property and
Director of the United States Patent and Trademark Office*